United States Patent [19]

Zarian

[11] Patent Number: 5,149,467
[45] Date of Patent: Sep. 22, 1992

[54] IMPROVED METHOD OF MANUFACTURE FOR CLAD OPTICAL CONDUIT

[75] Inventor: Jamshid J. Zarian, Woodland Hills, Calif.

[73] Assignee: Lumenyte International Corporation, Costa Mesa, Calif.

[21] Appl. No.: 769,628

[22] Filed: Sep. 30, 1991

Related U.S. Application Data

[63] Continuation-in-part of Ser. No. 566,726, Aug. 13, 1990, Pat. No. 5,052,778, which is a continuation of Ser. No. 304,417, Jan. 30, 1989, Pat. No. 4,957,347.

[51] Int. Cl.⁵ .................................................. G02B 6/20
[52] U.S. Cl. ........................................ 264/1.5; 385/125
[58] Field of Search ............... 385/123, 125, 141, 142, 385/143, 144, 145; 264/1.5

[56] References Cited

U.S. PATENT DOCUMENTS

| | | | |
|---|---|---|---|
| 3,434,774 | 3/1969 | Miller | 350/96 |
| 3,641,332 | 2/1972 | Reick et al. | 240/1 EI |
| 3,712,705 | 1/1973 | Marcatili | 350/96 WG |
| 3,813,141 | 5/1974 | Miller | 350/96 WG |
| 3,901,674 | 8/1975 | Strack et al. | 65/3 |
| 3,920,312 | 11/1975 | Siegmund | 350/96 R |
| 4,354,736 | 10/1982 | Maklad et al. | 350/96.32 |
| 4,957,347 | 9/1990 | Zarian | 385/125 |

Primary Examiner—John D. Lee
Assistant Examiner—John Ngo
Attorney, Agent, or Firm—Morgan, Lewis & Bockius

[57] ABSTRACT

A flexible, clad, monofilament optical conduit having a flexible light transmitting polymeric core having a relatively high refractive index which is surrounded by a shrunk, heat shrinkable cladding having a relatively low refractive index in comparison to that of the core and which has a relatively small, uniform gap between the outer periphery of the core and the inner periphery of the heat shrinkable cladding, and a method of manufacture whereby a plurality of such conduits are simultaneously produced by polymerization of the conduit core forming material within a length of unshrunken heat shrinkable material which in turn is contained within a relatively thick, durable protective tubing and removal of the relatively thick protective tubing subsequent to polymerization and then shrinking the heat shrinkable material to form a relatively uniform gap between the core and the clad. In order to prevent its collapse, the heat-shrinkable cladding is pressurized with an inert gas prior to being inserted within the protective tubing.

1 Claim, 3 Drawing Sheets

IMPROVED METHOD OF MANUFACTURE FOR CLAD OPTICAL CONDUIT

This application is a continuation-in-part of application Ser. No. 07/566,726 filed Aug. 13, 1990, now U.S. Pat. No. 5,052,778, which is a continuation of application Ser. No. 07/304,417 filed Jan. 30, 1989, now U.S. Pat. No. 4,957,347.

The present invention relates to improved clad optical conduit and a method of production therefor. The improved optical conduit and method of manufacture of the present invention concern cylindrical light emitting conduits which emit light from their outer circumferential surface in a more optically efficient manner, with a greater light intensity and in a more uniform manner than previously known. Optical efficiency refers to the ratio of light output to light input for a given tube length and cross section. The conduit of the present invention includes clad optical conduits in which a glass or polymeric core having a relatively high refractive index is surrounded by a cladding of a relatively low refractive index and a gap therebetween is created and is filled with air or some other material having a relatively low refractive index compared to that of the core.

Clad optical conduit of the general type within the field of the present invention, and their manufacture, are known, and are generally disclosed, for example, in U.S. Pat. No. 3,641,332 and application Ser. No. 300,202, field Jan. 23, 1989, still pending, for "Method, Apparatus and Composition of Matter For a High Temperature Plastic Light Conduit". A copy of Ser. No. 300,202, still pending, is filed herewith, to provide basis for subsequent incorporation by amendment. Although such clad optical conduit has been known for many years, a number of problems remain even with the improved conduit as described in application Ser. No. 300,202, still pending. Such remaining known problems include relatively poor optical efficiency, intensity and poor uniform light emittance at the outer peripheral surface of the cladding which surrounds the inner light transmitting core.

OBJECTS OF THE INVENTION

It is an object of the present invention to provide a clad optical conduit having improved optical efficiency.

It is a further object of the present invention to provide a clad, optical conduit having greater light emission from its circumferential periphery for a given light source.

It is a further object of the present invention to provide a clad, optical conduit having relatively uniform light emission distribution from its circumferential periphery even at regions where bends exists.

It is a further object of the present invention to provide a process for manufacture of clad optical conduit having improve optical efficiency properties in bent sections of conduit, in comparison to the optical efficiency properties of known clad optical conduit having the same degree of bending.

It is a further object of the present invention to provide a process for manufacture of a clad, optical conduit having relatively uniform light emission from its outer circumferential periphery.

It is a further object of the present invention to provide a process for the simultaneous manufacture of a plurality of clad, optical conduit having improved optical efficiency.

It is a further object of the present invention to provide a process for the simultaneous manufacture of a plurality of clad, optical conduits each having relatively uniform light emission from its outer circumferential periphery.

It is a further object of the present invention to provide improved optical conduit having improved optical efficiency and uniform light emission properties.

It is a further object of the present invention to provide clad, optical conduit having a relatively uniform gap between an inner core and an outer cladding.

It is a further object of the present invention to provide a heat shrinkable tube as the clad material on a clad, cylindrical optical conduit.

It is a further object of the present invention to provide a process for the manufacture of clad, optical conduit having a heat shrinkable cladding material and a uniform gap between the inside periphery of a cladding tube and the outside periphery of an inner core.

It is a further object of the present invention to provide a process for the manufacture of clad, optical conduit enabling the production of conduit lengths in excess of 40 feet with thin-walled cladding which will not collapse and thereby damage the conduit product during the manufacturing process.

SUMMARY OF THE INVENTION

The objects of the present invention are accomplished by the manufacture of a clad, optical conduit in which the conduit or core is surrounded by a shrunk, heat shrinkable tube, such as Teflon TM to provide a snug, uniform cladding around the core, and a relatively thin, uniform gap between the cladding and the core. The improved clad, optical conduit may be made in conventional reactors whereby a conventional monomer mixture is placed inside of expanded, heat shrinkable tubing, which in turn has been placed and secured snugly within another tube, or jacket made of a durable, relatively thick material, progressively polymerized from one end to the other to form a flexible core in a manner so as not to shrink the heat shrinkable tube to its fully shrunk condition prior to when the monomer mixture has achieved the degree of polymerization desired for the core while it remains in the reactor; removing the assembly containing jacket, heat shrinkable tubing containing the polymer core from the reactor; removing the jacket; and applying heat to the heat shrinkable tubing containing the polymeric core to cause it to shrink and form a snug fit clad around the polymeric core. Alternatively, the core may be made of other optically conductive material such as, for example, optical quality glass. The heat shrink cladding surrounding the core provides a clad, optical conduit having improved optical transmission and emission properties both in straight or bent configurations.

DETAILED DESCRIPTION OF THE PREFERRED EMBODIMENTS

The objects of the present invention are accomplished by a process in which clad, optical conduit is manufactured with the improved conduit having a light transmitting core having a relatively high refractive index surrounded by a cylindrical cladding made of a heat shrinkable material having a relatively low refractive index compared to that of the core and having a relatively narrow, uniform gap of air or other material between the inner periphery of the cladding and the outer periphery of the core. The core may be made of polymeric material as disclosed in Ser. No. 300,202, still pending, or may be made of glass, or other known materials used for the manufacture of optical conduit. The present invention is directed to such clad, optical conduit, the manufacture of single, clad, optical conduit and the simultaneous manufacture of a plurality of such clad, optical conduit.

By reference to FIGS. 1-9 preferred embodiments of the improved clad, optical conduit and their method of manufacture will be described.

Figure 1:
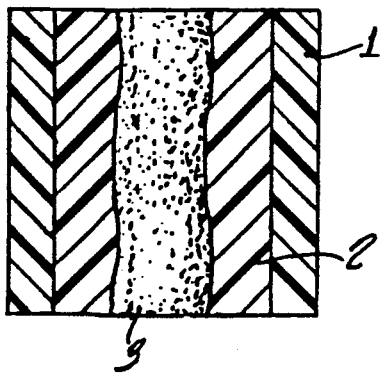
FIG. 1 is a cross-sectional view of a section of a conventional clad, optical conduit assembly prior to polymerization.
Figure 2:
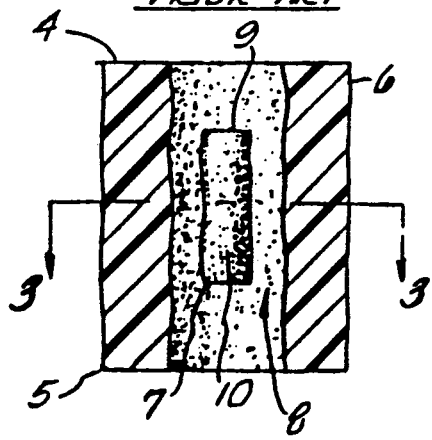
FIG. 2 is a cross-sectional view of a section of a conventional clad, optical conduit assembly after polymerization.

Referring first to FIGS. 1-2, known clad optical conduit and their method of manufacture will be described in order to provide a meaningful context within which problems known in the field of the invention will be discussed and within which the present invention will be described. As is known and described in application Ser. No. 300,202, still pending, incorporated by reference as if fully set forth herein, clad, optical conduit may be manufactured by a process in which cylindrical Teflon TM tubes are filled with a conventional monomer mixture, placed in a U-configuration in a reactor and then polymerized within and along the length of the tube within the reactor to form a flexible, light transmitting and emitting core having a relatively high refractive index surrounded by a comparatively low refractive index Teflon TM cladding. During and after polymerization the inner core typically exhibits shrinkage and, in conjunction with the cladding's lack of adhesive properties, causes a gap to be created between its outer periphery and the inner periphery of the Teflon TM cladding. As shown in FIG. 1, a before polymerization, cross-sectional view of a conventional, clad and jacketed tube assembly is shown having a flexible jacket 1 surrounding a conventional Teflon TM tube 2. Although the tube assembly may be of virtually any length and is generally bent into a U-shape for manufacturing and is up to about 40 feet in total length, for purposes of illustrating problems currently of interest in the field of the invention, a small section of a nominal straight tube length of about 20 feet having a top end 4 and a bottom end 5 is shown. The liquid monomer mixture 3 filled Teflon TM tube 2 of the type described in Ser. No. 300,202, still pending is then polymerized in a conventional manner, such as by progressive immersion of the tube assembly, from its lower end 5 to its upper end 4, in a relatively warm bath sufficient to permit relatively slow polymerization as also described in Ser. No. 300,202, still pending.

Figure 3:
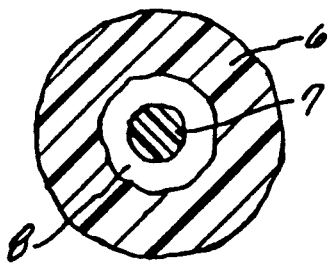
FIG. 3 is a cross-sectional view of the FIG. 2 clad, optical conduit taken along line 3—3.

After polymerization, as shown in FIG. 2, the polymerized, clad, optical conduit, with the flexible jacket 1 removed is illustrated as having a surrounding Teflon TM cladding 6 with its core 7 being of a polymerized, flexible light transmitting polymer having a relatively high refractive index. During the polymerization process the core material typically shrinks about 12–15 percent in volume. Because polymerization usually slowly takes place in the U-shaped tubes, the radial shrinkage is somewhat minimized and the weight of upper, liquid polymerizing mixture flows downward, tending to fill the Teflon TM tube 2. Also, because pure Teflon TM lacks any known adhesive properties, it pulls away from the wall of the polymerized core and tends to create a gap 8 between the inner periphery of the Teflon TM tube 6 and the core 7. As discussed in the '332 patent, an air gap or a gap filled with equivalent material is essential to achievement of good optical properties of the finished clad, optical conduit. Also, because of the shrinkage, the total length of the core 7 will decrease in comparison to the length of the monomer filling 3 in the pre-polymerized Teflon TM tube 2. Thus, the top end 9 and bottom end 10 of the polymerized core 7 are shown at different positions with respect to the Teflon TM clad top end 4 and bottom end 5 than prior to polymerization to illustrate this shrinkage phenomenon; although it should be appreciated that the actual shrinkage occurs at either end of the U-shaped tubes, both of which are at the "top" as described in Ser. No. 300,202, still pending. As shown in FIG. 3, a cross-sectional view taken along line 3—3 of FIG. 2, the outer Teflon TM cladding 6, the polymerized core 7 and the gap 8 are shown. Typically gap 8 contains only air, which has a nominal refractive index of 1.0. Typically, gap 8 is not uniform in width between the outer periphery of core 7 and cladding tube 6, as illustrated in both FIGS. 2 and 3. The gap 8 may contain some other optically conductive material besides air, such as for example silicone oil, so long as the filler material has a relatively low refractive index compared to the refractive index of the core 7, whether the core be of a polymerized material or of some other material such as glass.

Clad, optical conduit made by conventional processes, as described in U.S. Pat. No. 3,641,332 and Ser. No. 300,202, still pending have limitations regarding optical efficiency as well as scattering problems, such as for example that they exhibit numerous bright and dark spots, especially at bends in the conduit. Such optical conduit typically also have loose air pockets which can readily be felt and seen along their length. It is presently believed that at least part of the optical problems are associated with the relatively large and non-uniform gaps 8, as illustrated in FIGS. 2-3 and 8-9 of conventional clad, optical conduit.

Conventional clad, optical conduit typically has a relatively thin, i.e., 0.005 to 0.050 inch thickness Teflon ™ cladding with an inside diameter from about ⅝ to ¾ inch. The Teflon ™ cladding is a conventional fluorinated ethylene-propylene copolymer, such as for example fluorinated ethylene propylene sold as FEP TEFLON ™ made by DuPont, which may be simultaneously co-extruded with a thermoplastic jacket such as polyethylene or polyvinyl chloride to improve handling of the thin tubing. The jacketed Teflon ™ tube is filled with a thermosetting organic monomer mixture such as set forth in Ser. No. 300,202, still pending, which in turn is polymerized progressively along the length of the tubing assembly by a conventional process as described in Ser. No. 300,202, still pending. Due to the relatively low boiling point of the typical organic monomers used for the polymeric core, the polymerization reaction is preferably performed at relatively low temperatures and under pressure of up to about 250 psi to help avoid formation of bubbles and voids in the core during polymerization. The outer polyethylene or polyvinyl chloride jacket surrounding the thin Teflon ™ tubing functions to facilitate ease of handling and also functions to protect the thin Teflon ™ cladding in two ways. First, because typically a plurality of the tube assemblies are loaded inside the manufacturing reactor for simultaneous polymerization, the outer polyethylene or polyvinyl chloride jackets protect the relatively thin Teflon ™ tubing from collapsing due to the forces exerted by the weight of upper tubing assemblies positioned above relatively lower tubing assemblies. Second, because the thermosetting monomer mixture contracts during polymerization, a relatively high vacuum would be created inside of the Teflon ™ tubing in the absence of the jacket. Such a vacuum would tend to collapse the Teflon ™ cladding. However, the presence of the jacket walls creates a pseudo-adhesive force which is not well understood, but which prevents the Teflon ™ cladding from collapsing. During co-extrusion of the outer jacket and the inner thin Teflon ™ tubing the inside wall of the outer jacket and the outside wall of the Teflon ™ tubing come tightly together. When the hot polymer melt cools and subsequently contracts, a pseudo-adhesion force is also created between the outer periphery of the cladding and the inner periphery of the jacket to thus effectively counteract the force due to the vacuum created inside of the cladding.

Also, because of uneven contraction of the thermosetting monomer mixture during polymerization, both radially and laterally in relation to the cladding, and because the Teflon ™ tubing itself does not have a uniform inner diameter along its length, with radial variations of 0.003 to 0.005 inches in a typical ⅜" I.D. section of tubing, the range of gap widths varies along the length of the tubing. In other words, in reference to FIGS. 2-3, the distance between the core 7 and the cladding 6, i.e., the gap 8, will vary along any given length of the coated, optical tube and may also vary radially to produce readily observable air pockets.

The significance of non-uniformities in the gap 8 is that when light is introduced into one end of a straight light conduit, i.e.. the core tube, the varying gap widths cause the appearance of bright and dark spots on the outer periphery of the light emitting conduit. Further, when the light emitting conduit is bent or curved to form shapes, at the locations where the cladding comes in relatively closer proximity to the core, i.e., at bends, the light appears to be brighter than at straight regions along the conduit. Thus, in both straight and curved clad, optical conduits, the existence of non-uniform gaps defeats and detracts from the objective of emitting uniform light from the clad conduit. In many cases these relatively bright and relatively dark spots are readily observable to the naked eye.

In general, for coated optical tubes within the field of this invention, light is emitted at the end opposite the light source and through the circumferential periphery along its length. It is believed that the size of air gaps, i.e., the distance between the outer periphery of the core and the inner periphery of the Teflon ™ cladding and the length of the gap determine the intensity of emitted light along the gap. Thus, the present invention provides for a more intense emission of light along a gap for a given length, gap thickness and light source because its relatively smaller gap provides for a shorter distance of travel for the light emitted from the core to the surrounding cladding. Also, in comparison to the conventional clad optical conduit, a greater percentage of the total light is emitted from the circumferential periphery than from its non-source end. The non-uniformity of light from the circumferential periphery is believed to be determined by the non-uniformity of the air gap. Thus, the present invention, because of its narrow, uniform air gap in relation to conventional clad optical conduits, has not only greater intensity of emitted light but also improved uniformity of emitted light.

Figure 8:
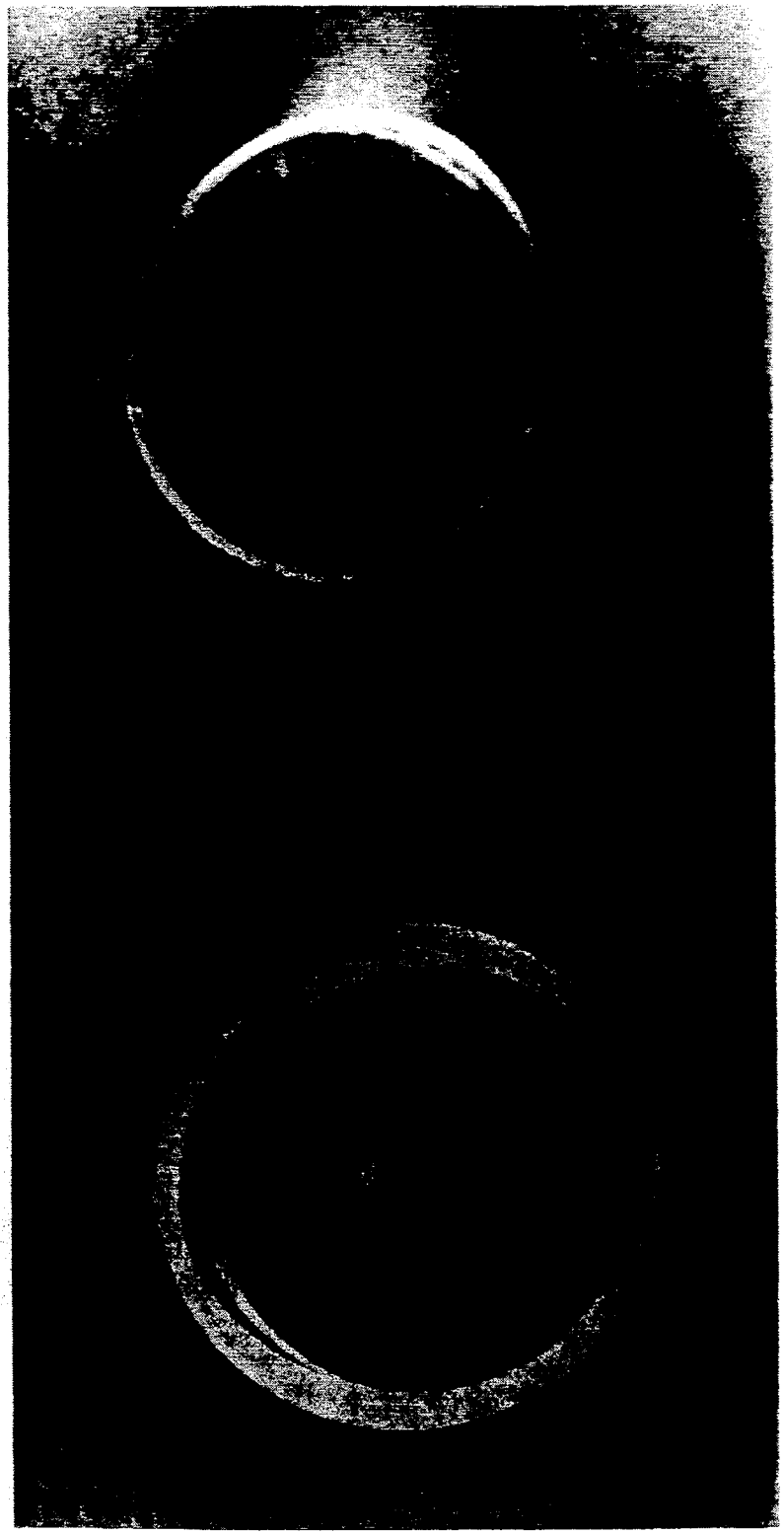
FIG. 8 is a photograph showing a cross-section of a clad, optical conduit as disclosed in Ser. No. 883,350, now abandoned, and a clad, optical conduit of the present invention.
Figure 9:
FIG. 9 is a photograph showing a light transmitting and emitting bent section of a clad, optical conduit as disclosed in Ser. No. 883,350, now abandoned, and a light transmitting and emitting a bent section of a clad, optical conduit of the present invention.

For example, the FIGS. 8-9 photographs illustrate this phenomenon. The lower portion of FIG. 8 shows, without magnification, a cross-section of a clad, optical conduit made in accordance with Ser. No. 883,350, now abandoned. To the left side of the conduit is a very distinct, crescent shaped gap which may be seen between the outer periphery of the core and the inner periphery of the Teflon ™ clad. The upper portion of FIG. 8 shows, also without magnification, a cross-section of a clad, optical conduit of the present invention. As may be readily observed there is no visible, uneven gap between the core and the clad. Indeed, the clad is so tightly formed around the core that no gap is visible, it being too narrow to be seen with the naked eye.

Referring to FIG. 9, a light emitting, conventional clad, optical conduit of Ser. No. 300,202, still pending, and a light emitting, clad conduit of the present invention are shown with an identical light source at one end of each conduit. The conduit of the present invention is the upper conduit, having the larger radius of curvature of the two. As is readily observable, the upper conduit is much brighter, thus illustrating the higher light emission property, or greater intensity of the present invention conduit. Also, the presence of non-uniformities in light output illustrated in the lower conduit, especially at its left side. These non-uniformities of emitted light correspond to air gaps which are readily observable with the naked eye as illustrated in FIG. 8. It is also readily observable from the FIG. 9 comparative photograph that the conduit of the present invention emits light relatively uniformly along its entire, bent length, whereas the conventional conduit has a higher intensity at the bend than along its straight portions.

Further in reference to FIGS. 4-7, the use of a heat shrinkable FEP TEFLON ™ or other, equivalent heat shrinkable material in a clad, optical conduit to aid in making a relatively narrow, uniform gap between the core and the cladding will be described. It has been discovered that use of a heat shrinkable Teflon ™ such as polytetrafluoroethylene (TFE), fluorinated ethylene propylene copolymer (FEP) or perfluoralkoxy resin (PFA) or other heat shrinkable material which has a low refractive index will result in production of clad, optical conduit having a uniform gap between the core and the cladding. It has also been discovered that not only will the gap be relatively uniform, but it will also be of relatively small, and therefore, of advantageous thickness along the entire length of the light emitting conduit. The optical efficiency and optical uniformity of straight as well as bent tubes are unexpectedly improved in conduit of the present invention compared to conventional conduit made with a non-shrinkable Teflon ™ cladding.

Methods of production and properties of heat shrinkable tubing are well known. Heat shrinkable tubing, is normally provided in its expanded, i.e., it un-shrunk or pre-shrunk state. With the brief application of heat such tubing shrinks and molds itself slowly around the form it was placed, even the most intricate and irregular shapes, to form, a snug, tight covering. Sources of heat and methods of heating expanded, heat shrinkable material are known and include, for example, by convection, radiation, or excess heat of reaction. Heat shrink tubings are available in various shrink ratios, such as for example, 1.3 to 1; 2 to 1; 3 to 1; 4 to 1; etc. Usually the shrinkage of the heat shrinkable tubing occurs only radially and the length of the tubing usually remains constant. Conventional heat shrinkable tubings are produced from numerous materials such as polyvinyl chloride, polyethylene and other poly (olefins) or fluropolymers. These heat shrinkable tubings are also available in sizes ranging from approximately 1/32" to 6" in diameter.

The present invention is directed to use of heat shrink tubings as previously described, preferably in conjunction with the manufacture of flexible, clad, optical conduit as described in Ser. No. 883,350, now abandoned. Production of clad, optical conduit of the present invention is presently limited to the size of the heat shrink tubing commercially available, presently believed to be 1/32" to 6" in diameter. It is within the scope of the present invention to produce smaller or larger diameter clad, optical conduits should smaller or larger diameter heat shrinkable tubing become commercially available. Also, although improved clad, optical conduits of the present invention can be prepared with conventional heat shrinkable materials, it is presently believed that certain impurities are found in heat shrinkable tubing prepared by conventional methods and that these impurities result in less than optimum optical properties for the finished clad, optical conduits of the present invention. It is therefore believed and preferred that heat shrinkable tubing be manufactured by employing in its manufacturing process an inert gas, such as helium, which will produce a heat shrinkable tubing having relatively fewer impurities and therefore will result in a finished, clad, optical conduit of the present invention having even further enhanced optical properties.

Figure 4:
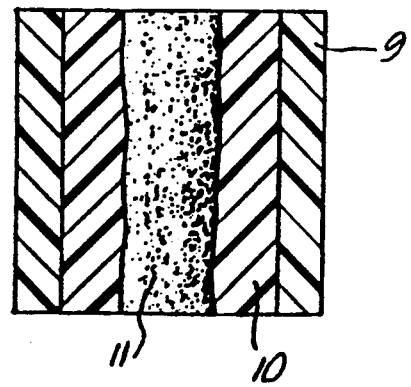
FIG. 4 is a cross-sectional view of a section of a clad, optical conduit assembly of the present invention prior to polymerization.
Figure 5:
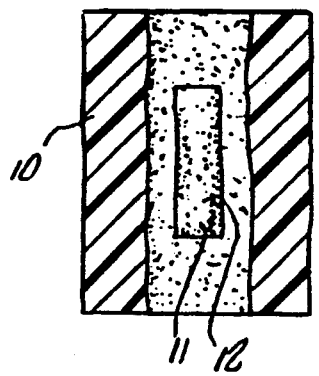
FIG. 5 is a cross-sectional view of a section of a clad, optical conduit assembly of the present invention after polymerization, but prior to application of heat.
Figure 6:
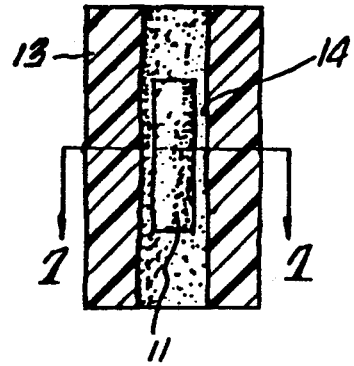
FIG. 6 is a cross-sectional view of a section of a clad, optical conduit of the present invention after polymerization, after removal of the jacket and after application of heat to shrink the heat shrinkable Teflon TM cladding.
Figure 7:
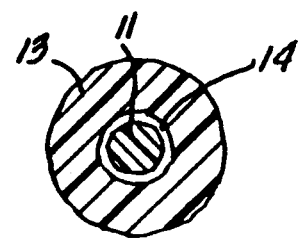
FIG. 7 is a cross-sectional view of the FIG. 6 clad, optical conduit taken along line 7—7.

As shown in FIG. 4, a jacket 9 surrounds an unshrunk or a pre-shrunk, heat shrinkable cladding 10 which in turn surrounds a liquid monomer mixture 11. Referring to FIG. 5, the pre-shrunk, heat shrinkable cladding 10 is shown containing the polymerized core 11, which has exhibited shrinkages as described with reference to FIG. 2. The jacket 9 of FIG. 4 has been removed. It may be observed that a narrow gap 12 remains between the core 11 and cladding 10. As shown in FIG. 6, after heat has been applied to the cladding 10, such as by hot air blower for example, the heat shrinkable Teflon ™ cladding 10 has been shrunk to form an even more narrow, relatively uniform gap 14 between the core 11 and the shrunk Teflon ™ cladding 13. FIG. 7, a cross-sectional view taken along line 7-7 of FIG. 6 illustrates this narrow, uniform gap 14. Gap 14 may be of air, or some other material having a refractive index relatively small in comparison to the refractive index of the core material 11.

EXAMPLE 1

A section of FEP TEFLON ™ heat shrinkable tubing with a nominal diameter of ⅜" and having a 1.6 to 1 shrink ratio, Zeus Industrial, Part No. 3H 6HS 0, in the expanded state was filled with a typical, conventional formulation of a thermosetting monomer mixture and was polymerized under pressure. After polymerization, the outer surface of the sample appeared to be non-uniform upon visual inspection. However when the sample was exposed briefly to heat, the heat shrinkable tubing exhibited uniform, radial shrinkage and the resulting clad conduit had a very uniform appearance based upon visual inspection. This sample was a laboratory scale sample in which a single tube was prepared. It appears from this sample that clad conduit having cross-section as shown in FIG. 7 can be made with substitution of a heat shrinkable thermal plastic cladding in place of a non-shrinkable type cladding.

Typically, however, for commercial quantities, clad, optical conduits are batch processed in reactors in which a plurality of tube assemblies containing monomer mixture are simultaneously polymerized and the above-described method may not yield good results in such batch processing.

EXAMPLE 2

A conventional reactor was loaded with a plurality of heat shrinkable tubing assemblies and filled with a conventional monomer mixture and then processed in the conventional fashion. It was discovered that the thin, heat shrinkable Teflon ™ tubings could not support themselves and their walls collapsed at various locations, as was readily observable upon visual inspection and which thus resulted in non-uniform gaps between the core and the cladding.

To alleviate this collapsing problem, as referred to previously with respect to conventional processing, a relatively thick, chemically stable flexible jacket could be used outside of the heat shrink cladding. Although it is conceivable with present technology to co-extrude FEP TEFLON ™ tubing inside of either a polyethylene or polyvinyl chloride or other polymer jacket via customary, continuous form melt extrusion, this would not, as a practical matter, be effective with heat shrinkable Teflon ™ tubing, because the heat released during the hot melt extrusion of the jacketing would cause the heat shrinkable Teflon ™ tubing to shrink from its expanded state to the shrunken state and thus result in defeating the main purpose for which the heat shrinkable tubing is used, that is, the creation of a narrow, uniform gap between the tube and the core in the tubing after the polymerization reaction has occurred. It is important to the present invention that the heat shrink occur during and/or after polymerization, rather than before polymerization of the core material so that a narrow, uniform gap between the core and the cladding results.

EXAMPLE 3

A four-feet long sample of the same heat shrinkable tubing mentioned in Example 1 was placed inside of a four-feet long section of polyethylene tubing. The polyethylene tubing or jacket was also cut along its entire length in order to facilitate insertion of the heat shrinkable tubing. The diameter of the tubing was chosen so that the heat shrinkable tubing, in its expanded form, fit very snugly inside of the polyethylene tubing. The thus nested tubings were wrapped with tape so that the heat shrinkable tubing was completely covered. The taped, nested tubings were then filled with a conventional thermosetting monomer mixture by placing the monomer inside of the heat shrinkable tubing. The monomer was then polymerized under pressure. After completion of polymerization, the polyethylene jacket was peeled off and the heat shrinkable tubing which contained the flexible, polymerized tube was of non-uniform, generally cylindrical configuration along its entire length upon visual inspection. When the polymerized section of Teflon TM cladding was exposed to heat, the heat shrinkable Teflon TM cladding shrank radially and yielded a clad, monofilament conduit which had a narrow, uniform, cylindrical appearance along its entire length upon visual inspection. The clad, monofilament conduit also exhibited fairly uniform light emission along its entire length and circumferential periphery, both in straight sections and bent sections.

EXAMPLE 4

A clad, monofilament conduit was made by the same procedure as in Example 3, except that a polyvinyl chloride jacket, which was also slit longitudinally, was used to wrap the heat shrinkable tubing and except that the slit was closed by gluing after insertion of the heat shrinkable tube. Other means to close the jacket may be used such as by tape, laser induced bonding or by other conventional methods. After polymerization and after heat shrinking of the heat shrinkable Teflon TM cladding, the clad conduit was of uniform, cylindrical contour along its entire length and emitted light of a very uniform flux along its entire length and periphery, both in straight sections and bent sections.

EXAMPLE 5

A plurality of conduit of the type described in Example 4 were prepared and loaded into a conventional polymerization reactor and polymerized, as described in Ser. No. 883,350, now abandoned. When the polyvinyl chloride jackets were peeled off the samples, each of the clad monofilament conduits in an unshrunken condition, had non-uniform, generally cylindrical contours along their entire length. Each of these conduits was then subjected to heat treatment and after treatment the finished, clad, conduits had uniform cylindrical contours along each of their entire length by visual inspection. Also each conduit was light tested and the light emitted from each conduit was very uniform along the entire length and along the circumference of each conduit upon visual inspection, both in straight and bent configurations.

EXAMPLE 6

A linear glass rod approximately 3' long with an outside diameter of 0.375" was cleaned with soap and water then washed with acetone twice and completely dried and flamed in an oven. The rod was then inserted inside an FEP heat shrinkable tubing, approximately 0.410" inside diameter with a wall thickness of 0.012". The heat shrinkable tubing was then shrunk around the rod with the application of heat. One end of the rod was placed in an illuminator and then illuminated. The rod emitted light out of its outer periphery much like a neon lamp. Change of color in the rod could be observed by changing the color of light at the source of light in the illuminator. The glass rod was not of optical quality, therefore the attenuation of the light was readily observable. It is believed, however, that use of an optical quality glass rod would significantly reduce attenuation of the light without effect on application of a heat shrinkable cladding to the glass rod to form a uniform, narrow gap therebetween.

As shown by these examples the heat shrink Teflon TM provides a means to form a narrow, uniform gap surrounding the core of a flexible, clad, monofilament conduit and/or of other optical conduit such as a glass rod.

As may be seen from the above-described examples, an improved, clad, optical conduit and method of manufacture are provided. Numerous modifications, alterations, alternate embodiments and alternate methods of manufacture may be contemplated by those skilled in the art and may be utilized in accomplishing the present invention of providing a cladding and a narrow, uniform gap surrounding the core of the optical conduit. Optical conduit and methods of manufacture as expressly set forth in the description of the preferred embodiments are not intended to be limitations of the present invention, but rather as illustrations of the inventive concepts of the present invention. It is envisioned that all such alternate means for forming a narrow, uniform gap surrounding the core are within the scope of the present invention as defined by the present claims.

During manufacture it has been found that a long length of thin-walled Teflon TM cladding is susceptible to collapse before it can be inserted inside the thicker-walled protective jacket. To prevent such collapse which would render the conduit product useless by damaging the polymeric core during polymerization and creating air-gap nonuniformities, the tubular cladding is pressurized with an inert gas prior to insertion within the jacket. The gas is released after the cladding is properly aligned within the jacket.

This manufacturing process step uses nitrogen gas pressurized between 40 and 80 psi which is free of water vapor and other impurities which would affect the optical properties of the polymeric core.

I claim:

1. The process of making a flexible, clad monofilament conduit comprising the steps of:
   selecting a length of a relatively durable polymeric tubular jacket;
   cutting a slit along the length of the jacket;
   selecting a length of tubular cladding form the group, pre-shrunken heat shrinkable fluorinated ethylene-propylene copolymer, perfluoralkoxy resin, and polytetrafluoroethylene tubing;
   closing one end of said tubular cladding with a stopper;
   pressurizing said tubular cladding with an inert gas and maintaining pressure;
   inserting said tubular cladding inside said jacket;

removing said stopper and releasing the inert gas from the tubular cladding;
placing a polymerizable mixture inside of the tubular cladding;
polymerizing the mixture to form a flexible tubular core;

removing the jacket; and
applying heat to the cladding effective to radially shrink the cladding to form a relatively narrow, uniform gap between the outer periphery of the core and the inner periphery of the cladding.

* * * * *